United States Patent Office 2,768,962
Patented Oct. 30, 1956

2,768,962

PROCESS FOR THE MANUFACTURE OF 2-CYANO-ETHYLATED N-SUBSTITUTED IMINES

Heinrich Krimm, Krefeld-Uerdingen, Germany, assignor to Farbenfabriken Bayer Aktiengesellschaft, Leverkusen, Germany, a corporation of Germany No Drawing. Application August 10, 1954,
Serial No. 448,999

Claims priority, application Germany August 24, 1953

16 Claims. (Cl. 260—464)

The present invention comprises a process for the manufacture of 2-cyanoethylated N-substituted imines.

According to the invention 2-cyanoethylated N-substituted imines are obtained from N-substituted aldimines or ketimines with at least one hydrogen atom on the α-carbon atoms, by conversion with acrylonitrile. The hydrogen atoms standing in 2-position of the imines are thereby replaced by β-cyanoethyl residues.

This reaction is similar to the conversion of aldehydes or ketones with acrylonitrile, but differs from it in a specific manner which is significant for certain organic syntheses. Whereas aldehydes and ketones react with acrylonitrile only in the presence of strong bases as catalysts, the corresponding N-substituted imines can react with acrylonitrile without catalysts. This shows that the conversion of aldehydes with acrylonitrile is practically without significance, because the aldehydes, in the necessarily strongly alkaline reaction, easily escape the desired conversion by aldol condensation.

In the reaction with ketones, when these are present in excess, preponderantly all activated hydrogen atoms on some of the total available ketone molecules are replaced by cyanoethyl residues, whilst the other ketone molecules are left unchanged. Thus in most cases more than one hydrogen atom is replaced, e. g. four with cyclohexanone. The reaction mixture then contains completely cyanoethylated ketone and also unreacted ketone.

As against this, the imines react with acrylonitrile in stages. With an excess of imine firstly one hydrogen atom will react in each available imine molecule, then a second hydrogen atom and so on, so that, according to the proportions and reaction conditions, mono-cyanoethylated, di-cyanoethylated imines and so on, can be obtained in a smooth reaction as main products. The present method therefore offers the advantage that partially cyanoethylated imines can be produced in a good yield.

As a rule, the ketoimines are only capable of adding, per mol, 1 mol of acrylonitrile on one and the same carbon atom, whilst the aldoimines add in stages as many mols of acrylonitrile per carbon atom as hydrogen atoms are available on them. In the case of acetaldoimines all 3 hydrogen atoms of the 2-carbon atom can therefore be replaced by cyanoethyl residues. From ketoimines there can thus be obtained 2-mono- or 2,2'-dicyanoethylated ketoimines, from aldoimines 2-mono-, 2,2-di- or 2,2,2-tricyanoethylated aldoimines as main reaction products.

The new compounds are valuable intermediate products for a great variety of organic syntheses. Thus, it is possible for example to produce mono- or bifunctional amines by hydrogenation, the corresponding 2-cyanoethylated aldehydes or ketones by cautious hydrolysis, and mono- or bifunctional formyl-carboxylic acids or ketocarboxylic acids by energetic hydrolysis, from which polycarboxylic acids may be obtained by oxidation if desired. The production of ketodicarboxylic acids is of special practical importance, because, for the above reasons, there are no other technically satisfactory processes via the direct synthesis of cyanoethylated ketones.

The N-substituted imines suitable for the present invention can be obtained in known manner by the condensation of aliphatic, cycloaliphatic, araliphatic or aromatic primary amines.

Suitable aldehydes are for example acetaldehyde, propionaldehyde, n-butyraldehyde, isobutyraldehyde, n-valeraldehyde, isovaleraldehyde, capronaldehyde, enathaldehyde, succindialdehyde, formylcyclohexane, phenylacetaldehyde and hydrocinnamic aldehyde.

Suitable ketones are for example acetone, methylethyl ketone, methyl-n-propyl ketone, diethyl ketone, methylisobutyl ketone, methyl-n-amyl ketone, ethyl-n-butyl ketone, methyl-n-heptyl ketone, diisobutyl ketone, methyl-tert.butyl ketone, acetyl acetone, acetonyl acetone, acetophenone, propiophenone, cyclopentanone, cyclohexanone, 1-methylcyclohexanone-2, 1-cyclohexyl-cyclohexanone-2, cyclohexandione - 1,4, acetyl-cyclohexanone, α-hydrindone, and α-tetralone.

Suitable amines are for example methylamine, ethylamine, n-propylamine, isopropylamine, n-butylamine, sec.-butylamine, tert.butylamine, isobutylamine, isoamylamine, n-dodecylamine, ethylendiamine, hexamethylendiamine, cyclopentylamine, cyclohexylamine, 4-methylcyclohexylamine, benzylamine, aniline, o-, m-, p-toluidine, o-, m-, p-chloraniline, o-, m-, p-nitroaniline, benzidine and p-anisidine.

According to the invention, the imine is heated to the necessary reaction temperature in mixture with an amount of acrylonitrile sufficient to form the desired reaction product. Sometimes it is advantageous to use more or less acrylonitrile than theoretically required. Satisfactory yields are often obtained by introducing the acrylonitrile into the imine at the reaction temperature, while stirring.

When adding one mol of acrylonitrile on one carbon atom, conversion is in general possible at normal pressure, because temperatures of for example from about 20° C. to about 150° C. are in most cases sufficient. The higher cyanoethylating stages on one carbon atom may however only be achieved at temperatures of from about 120° C. to 250° C., and corresponding pressures, in autoclaves. Apart from this, the most favourable temperature depends on the structure of the imine. Ketoimines for example which derive from aromatic amines, require in general higher reaction temperatures than those of the aliphatic or cycloaliphatic amine series. The most suitable temperature and pressure range can easily be established in each case by preliminary experiments.

It is possible to accelerate the reaction by catalysts. Suitable catalysts are basically acting compounds, such as alkali hydroxide or alkaline earth hydroxide, quaternary ammonium bases, for example trimethylbenzyl-ammonium hydroxide or triethylbenzyl-ammonium hydroxide, as well as high-molecular quaternary ammonium bases.

In order to avoid the polymerization of the acrylonitrile during the reaction, it is in most cases advantageous to add a small amount of a polymerization inhibitor, such as e. g. hydroquinone, tert.butylpyrocatechol or trinitrotoluene.

The following examples are given for the purpose of illustrating the invention.

*Example 1*

A mixture of 765 gm. (5 mol) of N-cyclohexyl-n-butyraldoimine, 265 gm. (5 mol) of acrylonitrile and 1 gm. of hydroquinone is slowly heated in an autoclave to 150° C. in a nitrogen atmosphere initially of 1 atm. pressure and the mixture is maintained at this temperature, until the pressure reduces to a constant value. The brownish reaction product is purified by vacuum distillation. 752 gm. of 2-(β-cyanoethyl)-N-cyclohexyln-butyraldoimine are obtained at 108–112°C./0.2 mm. Hg. Yield: 73% of the theoretical.
$C_{13}H_{22}N_2$ (206.3):

| Found, percent | Calculated, percent |
|---|---|
| C=75.24 | C=75.67 |
| H=10.79 | H=10.75 |
| N=13.41 | N=13.58 |

The distillation residue consists mainly of 2,2-di-($\beta$-cyanoethyl)-N-cyclohexyl-n-butyraldoimine.

The structure of 2-($\beta$-cyanoethyl)-N-cyclohexyl-n-butyraldoimine is confirmed in that saponification with dilute sulphuric acid yields 2-($\beta$-cyanoethyl-n-butyraldehyde having a boiling point at 107–108°C./0.6 mm. Hg, from which there is obtained, by hydrolysis with 20% caustic potash solution with disproportionation, $\gamma$-ethyl-varlero-lactone, having a boiling point of 64–66° C./0.2 mm. Hg and $\alpha$-ethylglutaric acid, of the melting point 59–60° C. The latter is identical with the dicarboxylic acid prepared by another method by K. Auwers (A. 292. 144 (1896)).

Example 2

64 gm. (1.2 mol) of acrylonitrile are introduced into a mixture of 153 gm. (1 mol) N-cyclohexyl-n-butyraldoimine, 1 gm. of triethylbenzyl ammonium hydroxide and 0.1 gm. of hydroquinone and the mixture is heated to boiling until the temperature has reached 150° C. By distilling the reaction product in vacuo there are obtained at 150–153° C./10 mm. Hg 165 gm. of 2-($\beta$-cyanoethyl)-N-cyclohexyl-n-butyraldoimine. Yield: 80% of the theoretical.

Example 3

A mixture of 765 gm. (5 mol) of N-cyclohexyl-n-butyraldoimine and 530 gm. (10 mol) of acrylonitrile is heated in an autoclave in a nitrogen atmosphere of initially 1 atm. pressure to 200° C., until the pressure has decreased from 8 atm. to 3.5 atm. The brownish reaction product which crystallizes on cooling, is purified by re-crystallization from light petroleum or cyclohexane. 906 gm. of 2,2-di-($\beta$-cyanoethyl)-N-cyclohexyl-n-butyraldoimine of melting point 63–64° C. are obtained. Yield: 70% of the theoretical.
$C_{16}H_{25}N_3$ (259.4):

| Found, percent | Calculated, percent |
|---|---|
| C=73.91 | C=74.08 |
| H= 9.70 | H= 9.72 |
| N=15.97 | N=16.20 |

The structure of the 2,2-di-($\beta$-cyanoethyl-N-cyclohexyl-n-butyraldoimine is confirmed by saponification with dilute sulphuric acid which yields 2,2-di-($\beta$-cyanoethyl)-n-butyraldehyde having a boiling point of 168–170° C./0.2 mm. Hg, from which my hydrolysis and oxidation with a mixture of concentrated sulphuric acid and nitric acid $\gamma$-carboxy-$\gamma$-ethyl-pimelic acid with melting point 170–171° C. is produced. This is identical with the tricarboxylic acid prepared by H. A. Bruson and T. W. Riener by another method (Am. Soc. 64, 2856 (1942)).

Example 4

A mixture of 195 gm. (1 mol) of N-cyclohexyl-enanthaldoimine, 64 gm. (1.2 mol) of acrylonitrile and 0.3 gm. of hydroquinone is heated in an autoclave in a nitrogen atmosphere initially of 1 atm. to 150° C., until the pressure has dropped to a constant value. The brown reaction mixture is worked up by vacuum distillation. 149 gm. of 2-($\beta$-cyanoethyl)-N-cyclohexyl-enanthaldoimine are obtained at 190–194° C./0.4 mm. Hg. Yield: 60% of the theoretical.
$C_{16}H_{28}N_2$ (248.4):

| Found, percent | Calculated, percent |
|---|---|
| C=77.22 | C=77.36 |
| H=11.25 | H=11.36 |
| N=11.37 | N=11.28 |

Example 5

A mixture of 125 gm. (1 mol) of N-cyclohexylacetaldoimine, 159 gm. (3 mol) of acrylonitrile and 1 gm. of hydroquinone is heated in an autoclave in a nitrogen atmosphere of initially 1 atm. to 200° C., until the pressure has been reduced from 8 atm. to 4 atm. The reaction product which on cooling partly crystallizes, is re-crystallized from toluene. 114 gm. of 2,2,2-tri-($\beta$-cyanoethyl)-N-cyclohexyl-acetaldoimine with melting point 109–110° C. are obtained. Yield: 40% of the theoretical.
$C_{17}H_{24}N_4$ (284.4):

| Found, percent | Calculated, percent |
|---|---|
| C=71.36 | C=71.79 |
| H= 8.79 | H= 8.51 |
| N=19.45 | N=19.70 |

Example 6

26.5 gm. (½ mol) of acrylonitrile stabilized with 25 mgm. of hydroquinone are added drop by drop to 89.5 gm. (½ mol) of N-cyclohexyl-cyclohexanonimine with vigorous stirring at 100° C. in the course of 1½ hours. The temperature is subsequently slowly raised to 150° C., until no further reflux of boiling acrylonitrile can be observed. The reaction product is distilled in vacuo. After the brief first runnings, 91 gm. of N-cyclohexyl-2-($\beta$-cyanoethyl)-cyclohexanonimine are obtained at 120–122° C./0.2 mm. Hg, as a yellowish oil. Yield: 78% of the theoretical.
$C_{15}H_{24}N_2$ (232.4):

| Found, percent | Calculated, percent |
|---|---|
| C=77.25 | C=77.53 |
| H=10.51 | H=10.41 |
| N=11.94 | N=12.06 |

The compound is soluble in acids and can be hydrolized by heating for 1 hour with an excess of mineral acid to 2-($\beta$-cyanoethyl)-cyclohexanone (boiling point 96–98° C./0.5 mm. Hg) and cyclohexylamine.

Example 7

53 gm. (1 mol) of acrylonitrile stabilized with 50 mgm. of hydroquinone are added drop by drop to 89.5 gm. (½ mol) of N-cyclohexyl-cyclohexanonimine with stirring at 130° C. in the course of 2 hours. The mixture is then heated for another 2 hours to 150° C., until no further reflux of boiling acrylonitrile can be observed. By vacuum distillation of the reaction product there are obtained, after the first runnings consisting of N-cyclohexyl-2-($\beta$-cyanoethyl)-cyclohexanonimine, 113 gm. of N-cyclohexyl-2,6 di-($\beta$-cyanoethyl)-cyclohexanonimine at 200–205° C./0.2 mm. Hg, as a thick, yellowish oil. Yield: 79% of the theoretical.

$C_{18}H_{27}N_3$ (285.4):

| Found, percent | Calculated, percent |
|---|---|
| C=76.05 | C=75.74 |
| H= 9.67 | H= 9.54 |
| N=14.53 | N=14.72 |

This dicyanoethylated ketoimine is also soluble in acids and can be saponified with an excess of mineral acid by heating for 1 hour to 100° C. to 2,6-di-(β-cyanoethyl)-cyclohexanone having the melting point 70° C.

*Example 8*

51 gm. (⅓ mol) of N-n-butyl-cyclohexanonimine are treated with 17.7 gm. (⅓ mol) of acrylonitrile stabilized with 20 mgm. of hydroquinone, and slowly heated to 150° C. until no further reflux of unreacted acrylonitrile can be observed. By the vacuum distillation of the reaction product 48 gm. of N-n-butyl-2-(β-cyanoethyl)-cyclohexanonimine are obtained at 116–118° C./0.9 mm. Hg as a pale oil. Yield: 74% of the theoretical.
$C_{12}H_{22}N_2$ (194.3):

| Found, percent | Calculated, percent |
|---|---|
| C=74.38 | C=74.17 |
| H=11.25 | H=11.41 |
| N=14.65 | N=14.42 |

*Example 9*

86.5 gm. (½ mol) of N-phenyl-cyclohexanonimine are heated with 26.5 gm. (½ mol) of acrylonitrile containing 25 mgm. of hydroquinone for 2 hours to 100° C., for 3 hours to 130° C. and finally to 150° C., until no further reflux of boiling acrylonitrile can be observed. By the vacuum distillation of the reaction product there are obtained 70 gm. of N-phenyl-2-(β-cyanoethyl)-cyclohexanonimine at 166–168° C./03 mm. Hg as a yellowish oil. Yield: 63% of the theoretical.
$C_{15}H_{18}N_2$ (226.3):

| Found, percent | Calculated, percent |
|---|---|
| C=79.45 | C=79.60 |
| H= 7.82 | H= 8.02 |
| N=12.60 | N=12.38 |

This cyanoethylated ketoimine can also be saponified in a smooth reaction to 2-(β-cyanoethyl)-cyclohexanone.

*Example 10*

56.4 gm. (⅓ mol) of N-cyclohexyl-methyl-n-propyl-ketoimine are treated with 17.7 gm. (⅓ mol) of acrylonitrile which contains 20 mgm. of hydroquinone, and the mixture is slowly heated to 150° C., until no further reflux of boiling acrylonitrile can be observed. By vacuum distillation of the reaction product 50 gm. of N-cyclohexyl-3-(β-cyanoethyl)-pentanone-2-imine are obtained at 111–114° C./0.4 mm. Hg as a pale oil. Yield: 68% of the theoretical.
$C_{14}H_{24}N_2$ (220.4):

| Found, percent | Calculated, percent |
|---|---|
| C=76.25 | C=76.31 |
| H=10.69 | H=10.98 |
| N=13.02 | N=12.71 |

This cyanoethylated ketoimine can also be saponified to 3-(β-cyanoethyl)-pentanone-2 having the boiling point 126–129° C./18 mm. Hg.

I claim:
1. A compound selected from the group consisting of aldoimines and ketoimines, an α-carbon atom thereof having at least one β-cyanoethyl group substituent, the remaining valencies of each α-carbon atom being satisfied by a substituent selected from the group consisting of hydrogen, mono-valent hydrocarbon radicals, and β-cyanoethyl groups, and a mono-valent hydrocarbon substituent satisfying a nitrogen atom valency of the imine group.

2. Compounds selected from the group consisting of mono-cyanoethylated aldoimines, polycyanoethylated aldoimines, mono-cyanoethylated ketoimines and 2,2'-dicyanoethylated ketoimines, each cyanoethylated substituent satisfying an α-carbon atom valency with the remaining valencies of each α-carbon atom satisfied by a substituent selected from the group consisting of hydrogen and mono-valent hydrocarbon radicals, and a mono-valent hydrocarbon substituent satisfying a nitrogen atom valency of the imine group.

3. A mono-cyanoethylated aldoimine containing a β-cyanoethyl group on the α-carbon atom with the remaining valencies of the α-carbon atom satisfield by a substituent selected from the group consisting of hydrogen and mono-valent hydrocarbon radicals, and a mono-valent hydrocarbon substituent satisfying a nitrogen atom valency of the imine group.

4. A polycyanoethylated aldoimine containing at least two β-cyanoethyl groups on the α-carbon atom with any remaining valency of the α-carbon atom satisfield with a substituent selected from the group consisting of hydrogen and mono-valent hydrocarbon radicals, and a mono-valent hydrocarbon substituent satisfying a nitrogen atom valency of the imine group.

5. A mono-cyanoethylated ketoimine having a β-cyanoethyl group on one α-carbon atom with the remaining valencies of the α-carbon atoms satisfield with substituents selected from the group consisting of hydrogen and monovalent hydrocarbon radicals, and a mono-valent hydrocarbon radical satisfying a nitrogen atom valency of the imine group.

6. A 2,2'-dicyanoethylated ketoimine having a β-cyanoethyl group on each α-carbon atom with the remaining valencies of the α-carbon atoms satisfied by a substituent selected from the group consisting of hydrogen and monovalent hydrocarbon radicals, and a mono-valent hydrocarbon substituent satisfying a nitrogen atom valency of the imine group.

7. A process for the production of 2-cyanoethylated N-substituted imines which comprises reacting acrylonitrile with a compound selected from the group of imines consisting of aldoimines having at least 2 hydrogen substituents on the α-carbon atom with the remaining α-carbon atom valency satisfied by a substituent selected from the group consisting of hydrogen and mono-valent hydrocarbon radicals and ketoimines with at least one α-carbon atom hydrogen substituent with the remaining valencies of the α-carbon atoms satisfield by a substituent selected from the group consisting of hydrogen and mono-valent hydrocarbon radicals, a mono-valent hydrocarbon substituent satisfying a nitrogen atom valency of the imine group of the selected imine.

8. Process for the production of 2-cyanoethylated N-substituted imines according to claim 7 wherein the ratio of the amounts of imine to acrylonitrile is about 1:1 mol.

9. Process for the production of 2-cyanoethylated N-substituted imines according to claim 7 wherein the ratio of the amounts of imine to acrylonitrile is about 1:2 mols.

10. Process for the production of 2-cyanoethylated N-substituted imines which comprises reacting an aceto-aldoimine with a mono-valent hydrocarbon group at the nitrogen atom with acrylonitrile, the ratio of the amounts of imine to acrylonitrile being about 1:3 mols.

11. Process for the production of 2(β-cyanoethyl)-N-cyclohexyl-n-butyraldoimine which comprises heating a mixture of N-cyclohexyl-n-butyraldoimine with acrylonitrile the ratio of the amounts being about 1 mol:1 mol in the presence of a little amount of hydroquinone in an autoclave under nitrogen pressure at 150° C.

12. Process for the production of 2-(β-cyanoethyl)-N-cyclohexyl-n-butyraldoimine which comprises adding to a mixture of N-cyclohexyl-n-butyraldoimine, a little amount of tri-ethyl-benzyl-ammonium-hydroxide and hydroquinone, acrylonitrile drop by drop the ratio of the amount of N-cyclohexyl-n-butyraldoimine and acrylonitrile being about 1 mol:1 mol at about 150° C. under atmospheric pressure.

13. Process for the production of 2,2-di-(β-cyanoethyl)-N-cyclohexyl-n-butyraldoimine which comprises heating a mixture of N-cyclohexyl-n-butyraldoimine and acrylonitrile the ratio of the amounts being about 1 mol:2 mols, in an autoclave under nitrogen pressure at about 200° C.

14. Process for the production of N-cyclohexyl-2-(β-cyanoethyl)-cyclohexanonimine which comprises adding acrylonitrile with a little amount of hydroquinone drop by drop to N-cyclohexyl-cyclohexanonimine at temperatures from about 100° C. to about 150° C. the ratio of the amounts of N-cyclohexyl-cyclohexanonimine and acrylonitrile being about 1 mol:1 mol.

15. Process for the production of N-cyclohexyl-2,6-di-(β-cyanoethyl)-cyclohexanonimine which comprises adding acrylonitrile with a little amount of hydroquinone drop by drop to N-cyclohexyl-cyclohexanonimine at temperatures from about 130° C. to about 150° C. the ratio of N-cyclohexyl-cyclohexanonimine and acrylonitrile being about 1 mol:2 mols.

16. 2-(β-cyanoethyl)-N-cyclohexyl-n-butyraldoimine.

References Cited in the file of this patent
UNITED STATES PATENTS

| | | |
|---|---|---|
| 2,353,687 | Bruson et al. | July 18, 1944 |
| 2,386,737 | Bruson | Oct. 9, 1945 |
| 2,394,530 | Bruson et al. | Feb. 12, 1946 |